US010295704B2

(12) United States Patent
Haas et al.

(10) Patent No.: US 10,295,704 B2
(45) Date of Patent: May 21, 2019

(54) WEATHER FORECASTING SYSTEM AND METHODS

(71) Applicant: INTERNATIONAL BUSINESS MACHINES CORPORATION, Armonk, NY (US)

(72) Inventors: Richard M. Haas, Wellesley, MA (US); Randy S. Johnson, O'Fallon, MO (US); Tedrick N. Northway, Wood River, IL (US); William H. Rinckel, Prospect, CT (US)

(73) Assignee: INTERNATINOAL BUSINESS MACHINES CORPORATION, Armonk, NY (US)

( * ) Notice: Subject to any disclaimer, the term of this patent is extended or adjusted under 35 U.S.C. 154(b) by 388 days.

(21) Appl. No.: 15/054,246

(22) Filed: Feb. 26, 2016

(65) Prior Publication Data
US 2016/0178803 A1 Jun. 23, 2016

Related U.S. Application Data

(63) Continuation of application No. 14/163,048, filed on Jan. 24, 2014, now Pat. No. 9,310,518.

(51) Int. Cl.
*G01W 1/10* (2006.01)
*G06T 7/20* (2017.01)
(Continued)

(52) U.S. Cl.
CPC ............... *G01W 1/10* (2013.01); *G01W 1/02* (2013.01); *G06T 7/001* (2013.01); *G06T 7/20* (2013.01);
(Continued)

(58) Field of Classification Search
CPC .. G01W 1/10; G01W 1/02; G06T 7/20; G06T 7/001; G06T 7/97; G06T 7/337;
(Continued)

(56) References Cited

U.S. PATENT DOCUMENTS 8,325,034 B2 12/2012 Moore
2002/0165933 A1 11/2002 Yu et al.
(Continued)

FOREIGN PATENT DOCUMENTS

EP 0907145 A2 4/1994
EP 1440856 A2 1/2003
(Continued)

OTHER PUBLICATIONS

Hallowell, R. et al., "An Automated Visibility Detection Algorithm Utilizing Camera Imagery", Advances and Applications in Transportation Weather, 2007, pp. 1-15.
(Continued)

*Primary Examiner* — Yoshihisa Ishizuka
(74) *Attorney, Agent, or Firm* — Brian Restauro; Andrew M. Calderon; Roberts Mlotkowski Safran Cole & Calderon, P.C.

(57) ABSTRACT

An approach for forecasting local weather patterns. The approach includes a method that includes receiving, by at least one computing device, images that include weather related information. The method includes analyzing, by the at least one computing device, the images to determine particular types of weather phenomena. The method includes analyzing, by the at least one computing device, the images to determine a motion of the particular types of weather phenomena. The method includes determining, by the at least one computing device, a weather forecast based on the analyzed images and the motion of the particular types of weather phenomena.

13 Claims, 8 Drawing Sheets

(51) Int. Cl.
  *G01W 1/02* (2006.01)
  *G06T 7/00* (2017.01)
  *G06T 7/33* (2017.01)
  *G06T 7/35* (2017.01)
  *G06T 7/70* (2017.01)
  *G06T 7/292* (2017.01)
  *G06T 7/90* (2017.01)

(52) U.S. Cl.
  CPC .............. *G06T 7/292* (2017.01); *G06T 7/337* (2017.01); *G06T 7/35* (2017.01); *G06T 7/70* (2017.01); *G06T 7/90* (2017.01); *G06T 7/97* (2017.01); *G06T 2207/10004* (2013.01); *G06T 2207/10016* (2013.01); *G06T 2207/30192* (2013.01)

(58) Field of Classification Search
  CPC .. G06T 7/35; G06T 7/70; G06T 7/292; G06T 7/90; G06T 2207/30192; G06T 2207/10004; G06T 2207/10016
  USPC ............................................................ 702/3
  See application file for complete search history.

(56) References Cited

U.S. PATENT DOCUMENTS

| | | |
|---|---|---|
| 2002/0181739 A1 | 12/2002 | Hallowell et al. |
| 2006/0209090 A1 | 9/2006 | Kelly et al. |
| 2012/0155704 A1 | 6/2012 | Williams et al. |
| 2013/0076926 A1 | 3/2013 | Arnold |

FOREIGN PATENT DOCUMENTS

| | | |
|---|---|---|
| EP | 1066577 B1 | 3/2007 |
| EP | 2153250 A1 | 2/2010 |

OTHER PUBLICATIONS

Hallowell, R. et al., "Automated Extraction of Weather Variables from Camera Imagery", Proceedings of the 2005 Mid-Continent Transportation Research Symposium, 2005, pp. 1-12.

Unknown, "Deep Thunder", http://www-03.ibm.com/ibm/history/ibm100/us/en/icons/deepthunder/, Nov. 26, 2013, 3 pages.

Unknown, "Helios", http://www.exelisinc.com/solutions/Helios/Pages/default.aspx, Exelis, 2011, 3 pages.

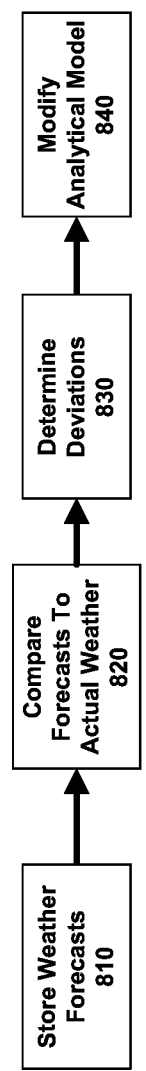

WEATHER FORECASTING SYSTEM AND METHODS

FIELD OF THE INVENTION

The present invention generally relates to weather forecasting, and more particularly, to a method and system for using images to forecast local weather patterns.

BACKGROUND

Weather forecasting has been performed by using a variety of different methods, such as using reports along shipping routes or using other traditional predictive methods, such as the use of almanacs. In more recent times, reports from aircraft routes, in particular the use of reconnaissance aircraft, are used to obtain information about current weather trends to forecast upcoming weather. Satellite technology, located in orbits around the Earth (e.g., Low Earth orbit (LEO), geostationary, etc.), has also enhanced the ability to obtain information and to more accurately forecast the weather by being able to view a large portion of the Earth's area at any given time.

SUMMARY

In a first aspect of the invention, a method includes receiving, by at least one computing device, images that include weather related information. The method further includes analyzing, by the at least one computing device, the images to determine particular types of weather phenomena. The method further includes analyzing, by the at least one computing device, the images to determine a motion of the particular types of weather phenomena. The method further includes determining, by the at least one computing device, a weather forecast based on the analyzed images and the motion of the particular types of weather phenomena.

In another aspect of the invention, there is a computer program product for determining a weather forecast. The computer program product includes a computer usable storage medium having program code embodied in the storage medium. The program code is readable/executable by a computing device to receive images from one or more devices that are located in different geographic locations. The images can include information relating to at least one of rain, hail, sleet, snow, clouds, and lightening. The computer program product includes analyzing the images for weather related phenomena. The computer program product includes analyzing the images for movement of the weather related phenomena associated with at least one of constant weather phenomena and evolving weather phenomena. The computer program product includes determining the weather forecast based on the analyzed images, which includes a probability that the weather forecast occurs.

In a further aspect of the invention, there is a computer system for determining a weather forecast. The system includes a CPU, a computer readable memory and a computer readable storage medium. Additionally, the system includes one or more program instructions. Program instructions are operable to receive images from multiple cameras located in different geographic areas. Program instructions are operable to receive time and location information associated with the images. Program instructions are operable to receive sensor information related to at least one of temperature, pressure, magnetic levels, and humidity. Program instructions are operable to analyze the images and the sensor information to determine weather phenomena occurring at the multiple cameras over a predetermined time period. Program instructions are operable to analyze the images to determine movement of the weather phenomena associated with at least one of constant weather phenomena and evolving weather phenomena. The constant weather phenomena does not change between the different geographic areas and the evolving weather phenomena changes between the different geographic areas. Program instructions are operable to determine a total weather forecast that is based on the images and the sensor information to determine a weather forecast including a probability level associated with the weather forecast being at a certain location. Program instructions are operable to extrapolate the total weather forecast to cover locations not associated with any of the multiple cameras. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 3-8 show example flows for determining weather forecasts in accordance with aspects of the present invention.

DETAILED DESCRIPTION

Figure 1:
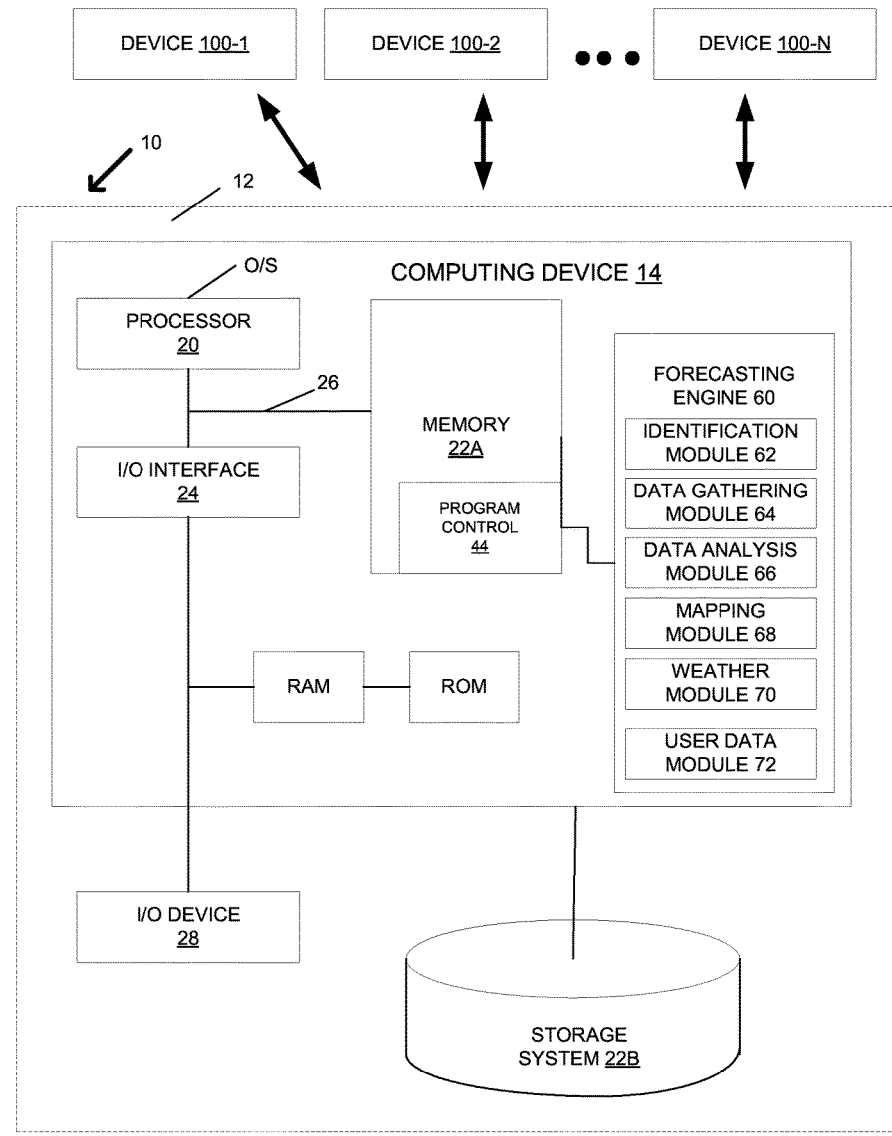
FIG. 1 an illustrative environment for implementing the steps in accordance with aspects of the present invention.

The present invention generally relates to weather forecasting, and more particularly, to a method and system for using images to forecast local weather patterns. The present invention uses images (e.g., photos, video, etc.) from one or more cameras (e.g., traffic, security, mobile devices, etc.) to determine local weather conditions and develop both macro (e.g., for a city, one or more counties, a state, a nation, etc.) and/or micro (e.g., a city block, a zip code, or a portion of zip code, etc.) weather forecast predictions for a particular area versus general weather forecast that utilize radar and/or satellite systems.

In embodiments, the images can be provided as unstructured data and/or structured data that the present invention filters and analyzes to distill relevant weather conditions by extrapolating the data to determine a forecast for a location. For example, unstructured data can be any data that is not organized in a pre-defined manner, while structured data can reside as a value within a fixed location within a file of information (e.g., a number value). As such, information from multiple images can be aggregated to provide weather forecasts for a location at different points in time.

In embodiments, the present invention can: (i) identify and physically locate different cameras and store their location information; (ii) capture summary and detailed imagery from the cameras and analyze the images against known weather condition profiles to identify weather conditions for a particular area; (iii) generate a weather forecast for an area by examining individual images from a single camera and associating the unstructured data in the images to known weather pattern profiles stored in a database; (iv) generate weather forecasts at distinct locations by determining the motion and evolution of weather across distinct camera locations by correlating the weather conditions with stored weather pattern profiles; (v) aggregate the different weather forecasts into weather forecasts onto a weather map; (vi) extrapolate the weather forecast to cover gaps in a particular geographic area; and/or (vii) provide localized weather forecasts to users via applications that display street level imagery, regional forecasts, and/or national weather forecasts.

As a result, the present invention uses images to determine current weather conditions and the movement of different weather phenomena to produce accurate forecasts of weather conditions. The forecasted weather conditions are then provided to users who may subscribe to a system that generates a weather forecast. The subscription may be free of charge or may require payment of a fee to access a weather forecast. Thus, the present invention provides additional uses for currently collected information (e.g., for traffic camera images, security camera images, etc.) and leverages the collected information to be used for weather forecasting, as well as providing a revenue stream for the provider of the weather forecasting information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system that can perform the processes described herein, and one or more devices 100-1, 100-2, . . . , 100-N (hereinafter referred to in the singular as device 100 and in the plural as devices 100). In embodiments, device 100 can be any computing device that is capable of sending any type of imagery content (e.g., photos, video, streaming multimedia information, etc.) and any other type of information, such as humidity levels, temperature readings, etc., to server 12 and/or computing device 14. Device 100 can be a camera, a video camera, a mobile camera, or any other type of device capable of taking images (e.g. photos and/or video content) and/or taking different types of weather related information (e.g., temperature, pressure, etc.) and providing such information to the server 12. Furthermore, server 12 includes a computing device 14. The computing device 14 can be resident on a network infrastructure or computing device of a third party service provider (any of which is generally represented in FIG. 1).

The computing device 14 includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard, etc.

In general, processor 20 executes computer program code (e.g., program control 44), which can be stored in memory 22A and/or storage system 22B. Moreover, in accordance with aspects of the invention, program control 44 controls a forecasting engine 60, e.g., the processes described herein. Forecasting engine 60 can be implemented as one or more program code in program control 44 stored in memory 22A as separate or combined modules. Additionally, forecasting engine 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, forecasting engine 60 is configured to collect images and other information from one or more devices, such as video cameras, traffic cameras, smart phones, etc., over different points in time. Forecasting engine 60 can receive the information and use the information to perform different types of analysis (e.g., time series analysis) by using one or more modules, such as an identification module 62, a data gathering module 64, a data analysis module 66, a mapping module 68, a weather module 70, and/or a user data module 72. While FIG. 1 shows all the modules as being stored by forecasting engine 60, one or more of the modules can be stored on device 100 and/or on any other computing device in communication with forecasting engine 60 or separate or dedicated processing or modules.

In embodiments, identification module 62 is configured to identify and physically locate devices 100 (e.g., cameras, video cameras, mobile devices, smart phones, traffic cameras, security cameras, etc.) that are connected via a network to forecasting engine 60. Specifically, identification module 62 can send a communication (e.g., pings, messages, etc.) to different devices 100 and request the identification and location information. Identification module 62 may have identifier information and the respective location information stored regarding one or more different devices 100. Additionally, or alternatively, identification module 62 can automatically receive identification and location information (e.g., serial number, IP address, MDN, name, etc.) from different devices when a user of one of those different devices 100 agrees to provide photos and/or video content from a device to forecasting engine 60. In embodiments, identification module 62 may send device identification information to a storage device (e.g., storage system 22B) associated with forecasting engine 60.

In embodiments, data gathering module 64 is configured to capture summary and detailed photo and/or video content as unstructured data and/or structured data from devices identified by identification module 62. Data gathering module 64 analyzes the data by matching against known weather condition profiles to identify weather conditions at a particular location. Data gathering module 64 can gather different types of information, such as individual images, video with no sound, video with sound, and/or information from sensors that can respond to physical stimulus such as heat, light, sound, pressure, magnetism, or motion (e.g., wind motion). Also, the image can be of any particular level of image quality or may be limited to image quality levels that exceed a threshold (e.g., images have a particular number of pixels, images have a particular bit rate level, etc.). The data (e.g., unstructured and/or structured data) can be sent to data gathering module 64 at a particular time (e.g., at 1:00 p.m. every day) or after intervals of time (e.g., every five minutes, every hour, every two hours, etc.). Alternatively, data gathering module 64 can send out a request (e.g., a ping, a message, etc.) to each device after an interval of time (e.g., every five minutes, etc.), at a particular time of the day (e.g., at 9:00 a.m., 3:00 p.m., etc.), and/or a particular day (e.g., only during weekdays, weekends, particular days of the week, etc.). In embodiments, data gathering module 64 can send the information to data analysis module 66 and/or mapping module 68.

In embodiments, data analysis module 66 is configured to correlate changes in weather conditions at a device 100, e.g., a single camera location, to known weather pattern profiles to forecast weather conditions at a particular location. Accordingly, the single camera time series analysis includes performing image pattern matching for images captured at different times from a single camera. This image pattern matching includes comparing shapes (e.g., size of rain drops, hail, snow, etc.) within individual images captured at specific times with shapes representing weather characteristics stored by forecasting engine 60. Based on the image pattern matching, data analysis module 66 can analyze an image to determine whether the image has rain, snow, sun, frost, hail, or any other type of weather condition.

Additionally, or alternatively, data analysis module 66 can analyze the level of grey within an image to determine a density level that is associated with a particular type of weather (e.g., image with 40% grey indicates grey skies, 10% grey indicates a clear blue sky, etc.). Additionally, data analysis module 66 can analyze different cloud shapes to determine the type of cloud and if there is any type of precipitation associated with the cloud (e.g., thunderclouds have a different shape than a white cloud).

Not only are individual images analyzed, data analysis module 66 can also identify changes across a series of images for the same device and identify changes across a series of images and compare the changes with characteristics stored by forecasting engine 60 to find weather patterns specific to the device's location. Thus, a correlation is performed to identify weather patterns at each device's location to a database of predictive weather patterns and, a level of probability (e.g., 40%, 50%, etc.) is determined that the forecasted weather will occur. In embodiments, data analysis module 66 can send the weather forecast to weather module 70.

In embodiments, mapping module 68 is configured to determine weather forecasts at distinct locations by: (i) determining the motion of weather across distinct camera locations by using images from different cameras and/or devices; and (ii) correlating the movement of weather conditions with weather pattern profiles. Accordingly, mapping module 68 can access one or more databases that contain maps of weather conditions at different points in time, also known as weather maps. In embodiments, a weather map can be a map that includes meteorological features, designated by different symbols, across a region at a particular time for previous weather phenomena that occurred in a particular geographic area. The weather map can include information (e.g., number values) and/or symbols to indicate pressure levels, temperature levels, motion of different weather phenomena (e.g., rain, snow, fog, etc.). In embodiments, mapping module 68 may determine that the weather maps used may not exceed a particular age threshold (e.g., only weather maps that are less than one month old, six months old, etc., can be used).

Once mapping module 68 has received images and/or other information from devices 100, the weather conditions from the images are analyzed across time by identifying movement and changes in weather conditions across a series of weather maps. In embodiments, the weather conditions in the images can be constant weather features that represent phenomena that can maintain their attributes as they move from one geographic point to another on a map. Thus, mapping module 68 can identify the type and motion (e.g., speed and direction) of these features to known weather attributes. Additionally, or alternatively, the weather conditions in the images can be evolving weather features that represent phenomena that can change attributes over time as they move from one geographic point to another on a map. Thus, mapping module 68 correlates the changes in evolving weather features to known weather attributes.

Accordingly, the method and processes of the present invention generate weather forecasts based on motion that predict movement of constant or evolving weather features across a map, using speed and direction along with a probability of occurrence. This includes predicting a probability of occurrence for the evolution of weather features and their motion across a map over time, using speed, direction, and correlation to known weather patterns. With weather forecasts generated, based on constant and/or evolving weather features, mapping module 68 sends the weather forecast to weather module 70.

In embodiments, weather module 70 is configured to aggregate the weather forecasts from data analysis module 66 and mapping module 68 into a total weather forecast and also determines an overall probability of the aggregated weather forecast. The weather forecast may be for a particular amount of time in the future (e.g. for the next ten hours, 24 hours, five days, month, etc.).

Furthermore, weather module 70 extrapolates the weather forecast to cover areas of a weather map, or any other type of map, that may not have cameras and/or other devices providing images to forecasting engine 60. For example, forecasting engine 60 may provide a weather forecast for 75% of a zip code. The remaining 25% of the zip code may be estimated by extrapolating the weather forecast by using movement of the weather phenomena. Additionally, or alternatively, weather module 70 may store the weather forecasts in a database (e.g. storage system 22B) for further analysis. In embodiments, weather module 70 can send the total weather forecast to user data module 72.

In embodiments, user data module 72 is configured to provide localized weather forecasts to individual users who subscribe to the weather forecasting system associated with forecasting engine 60. As such, user data module 72 can provide the weather forecast information generated by forecasting engine 60 in a user friendly format that includes icons, maps, graphs, and other features that allow the user to understand the weather forecast. For example, a consumer, using their own device (e.g., a smart-phone, desktop computer, etc.) can request the weather forecast for one or more locations. User data module 72 may receive the request and determine the requested locations for providing weather forecast information. In embodiments, user data module 72 may interact with other modules (e.g., weather module 70) to obtain the aggregated information for the requested location. Accordingly, user data module 72 may convert the information to a user friendly format (e.g., a map that can be displayed on a web page) to be displayed on the user's computing device.

Forecasting engine 60 can also include additional modules. For example, forecasting engine 60 may determine the accuracy of the forecasted weather and provide recommendations and/or improvements to how future weather forecasts should be performed. In embodiments, this may include one or more modules for comparing observed weather conditions with previously forecast weather conditions for the same time. As such, deviations between the current conditions and the forecast are identified. These deviations are then stored and are used to improve the weather forecasting models that derive the weather condition map analysis or single camera time series analysis.

In a non-limiting example using the information of FIG. 1, three sites, 1, 2, and 3 are located equidistant from each other and follow a geodesic. Based on stored weather profiles of past weather events, forecasting engine 60 knows that site 3 experiences the same weather, within a six hour period of time as site 2 at least 80% of the time. Furthermore, for example, information from site 1 is sent to forecasting engine 60 that indicates that site 1 experienced hail at 8:00 a.m. and that site 2, at 9:00 a.m., is also experiencing hail. Based on this information, forecasting engine 60 can forecast that site 3 is to experience hail at 10:00 a.m. with an 80% probability.

In another non-limiting example using the information of FIG. 1, again using sites 1, 2, and 3, it is determined at single camera site 3, the sky was 60% overcast with large cumulonimbus clouds, one hour ago. Currently, site 3 has a sky that is 100% overcast and has light levels dropping by 40%. As such, forecasting engine 60 generates a predictive weather pattern that shows 50% overcast skies with cumulonimbus clouds at time "t," 100% overcast skies at "t+1" hour, where "t" is the current time, and hail at "t+2" hours occurring 80% of the time. Thus, forecasting engine 60 will forecast that site 3 will have an 80% probability of hail in one hour. Thus, a weather forecast can be generated by using a time series of images at individual locations to identify changes in weather conditions that are compared to stored predictive weather patterns.

Figure 2:
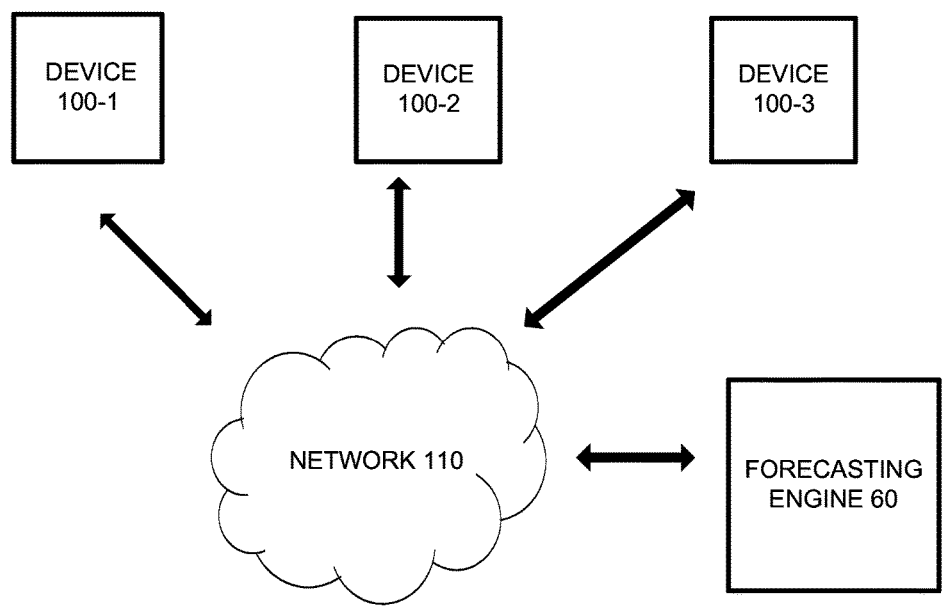
FIG. 2 is an example network diagram for implementing the steps in accordance with aspects of the present invention.

FIG. 2 shows an example network diagram in accordance with aspects of the invention. FIG. 2 shows forecasting engine 60, devices 100-1, 100-2, 100-3, and network 110. While FIG. 2 shows a particular quantity of each type of device and/or network, there may be additional or fewer devices, engines, and/or networks.

Forecasting engine 60 may include a computation or communication device that is capable of communicating with a network (e.g., network 110) and receiving information that can be used to determine weather forecasts for a particular location. In embodiments, forecasting engine 60 can include one or more modules, as described in FIG. 1, to receive information, analyze the information, determine the weather forecast, and generate weather forecasts information for subscribers to a system that uses forecasting engine 60.

Devices 100-1, 100-2, and/or 100-3 may include any computation or communication device that is capable of communicating with a network (e.g., network 110) and can record images and/or other types of information. For example, devices 100-1, 100-2, and/or 100-3 can be a traffic camera, a security camera, a camera, a video recorder, a combination video recorder and camera, a mobile camera, a device that has a built-in camera (e.g., a smart-phone, a tablet, a laptop, etc.), or any other type of device. In embodiments, devices 100-1, 100-2, and/or 100-3 can receive and/or display content, which can include, for example, objects, data, images, audio, video, text, and/or links to files accessible via one or more networks. In embodiments, devices 100-1, 100-2, and/or 100-3 can record images, such as photos, videos, multimedia images, etc., and send those images and/or other information to forecasting engine 60.

Network 110 may include one or more networks that allow for communication between different devices (e.g., devices 100-1, 100-2, and/or 100-3, forecasting engine 60, etc.). In embodiments, network 110 provides for devices 100-1, 100-2, and/or 100-3 to transmit information to forecasting engine 60 for analysis. In embodiments, network 110 can comprise an Internet, Intranet, local area network (LAN), wide area network (WAN), a GPS network, radio access network, a wireless fidelity (Wi-Fi) network, a Worldwide Interoperability for Microwave Access (Wi-MAX) network, a cellular network, and/or a combination of these or other networks.

Flow Diagrams

FIGS. 3-8 show exemplary flows (e.g., swim lane diagrams) for performing aspects of the present invention. The steps of FIGS. 3-8 may be implemented in the environment of FIG. 1 and/or FIG. 2, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
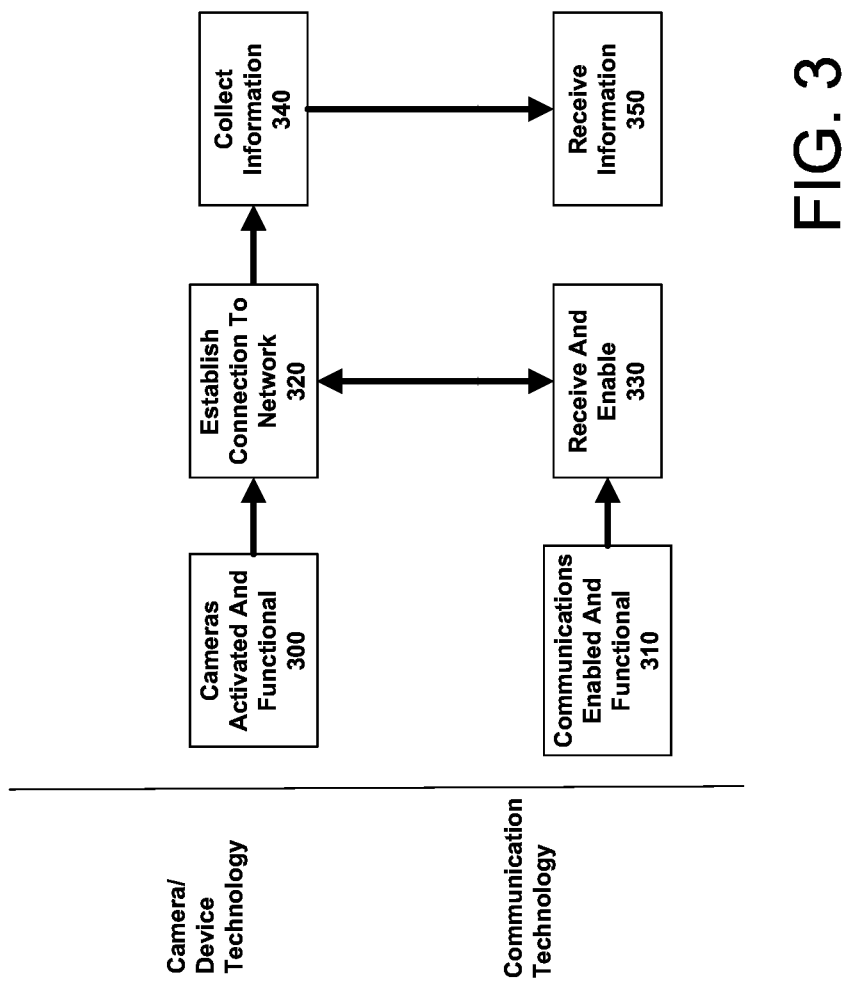

FIG. 3 shows an example swim lane diagram for establishing a network of cameras in accordance with aspects of the present invention. At step 300, the cameras and/or other devices that provide images and weather related information are activated and determined to be functional. In embodiments, the camera and/or the other device may be stationary (e.g., a traffic camera, security camera, etc.) or may be mobile (e.g., a mobile phone, a camera located on a vehicle—police car, a drone, a boat, a plane, etc.). At step 310, a communications network that allows for transmitting information between the cameras and/or other devices and a forecasting engine (as described above) is enabled.

At step 320, the cameras and/or other devices establish a connection with the communications network. In embodiments, the cameras and/or other devices automatically request to connect to the communications network. Alternatively, the camera and/or other devices can receive a request/message from the forecasting engine to connect to the network and, as such, the cameras and/or other devices then request to connect to the communications network. At step 330, the communications network receives the connection request and connects the cameras and/or other devices to the communications network.

At step 340, the cameras and/or other devices collect and then send information to the forecasting engine, via the communications network. The information may be sent as streaming information (e.g., a video stream), as photos during intervals of time (e.g., every five minutes, every hour, etc.), and/or as any other type of information (e.g., temperature readings, pressure readings, etc.) to the forecasting engine. Further, the information can be any particular image quality or can be received only if the images have a threshold quality level (e.g., number of pixels, bit rate, bits, etc.). At step 350, the network receives the information and sends the information to the forecasting engine and/or any other device associated with the forecasting engine. In embodiments, the forecasting engine receives the information and analyzes the information to determine a weather forecast.

Figure 4:
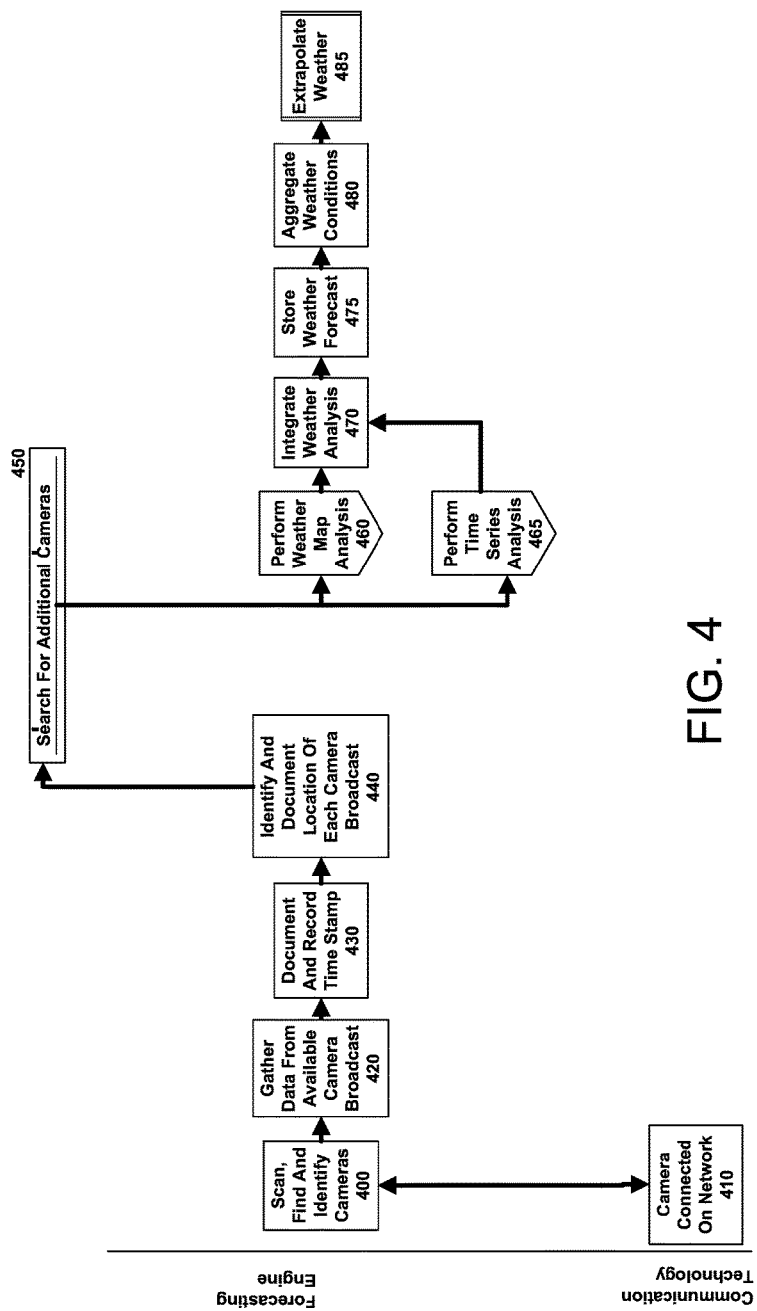

FIG. 4 shows an example swim lane diagram for weather forecast analysis in accordance with aspects of the present invention. At step 400, a forecasting engine identifies devices. In embodiments, the forecasting engine may store a database that includes identifiers (e.g., Internet Protocol (IP) addresses, mobile directory number (MDN), name, etc.) that identify different cameras and/or devices that can provide images and/or other information. For example, a municipality may have agreed to allow the forecasting engine to receive information from that municipality's traffic cameras. Thus, the municipality camera may have its IP address stored by the forecasting engine. Also, for example, a smart-phone user may have signed up and agreed to send weather related information to the forecasting engine. As such, the smart-phone may have its MDN stored by the forecasting engine.

At step 410, the camera is connected to the network. For example, communications network sends a request for information to the cameras and/or other devices receive the request for information. For example, the forecasting engine sends a message to the camera and the camera automatically sends the requested information. Alternatively, for example, the forecasting engine sends a message to a smart-phone and the smart-phone user responds by taking a photo and/or video. Regardless of how the camera and/or other device receive the request, weather related information can be sent to the forecasting engine.

At step 420, the forecasting engine receives the data, such as images and/or other information, from the cameras and/or other devices. In embodiments, the forecasting engine can receive the information from the cameras and/or other devices based on the forecasting engine sending a request as described in step 410. In alternate embodiments, the forecasting engine can receive the information from the camera and/or other devices based on the camera and/or other devices automatically sending information to the forecasting engine without requiring the forecasting engine to send a request as described in step 410. At step 430, the forecasting engine stores the information and also records a time stamp (e.g., a time, day, month, year, and/or any other time value) for when the images and/or other information are received by the forecasting engine.

At step 440, the forecasting engine identifies and documents the location of each of the cameras and/or devices that are sending images and/or other information to the forecasting engine. If the image has been sent from a mobile device (e.g., a smart-phone, a camera connected to a vehicle, etc.), then the forecasting engine can use IP addresses, global positioning system (GPS) information, and/or other locator type information to determine the location of the mobile device at the time that the mobile device sent the information. In embodiments, the location of a camera and/or device can already be stored by the forecasting engine.

At step 450, the forecasting engine can perform a search for additional cameras and/or other devices that may have connected to the network after the initial search, described in step 400. For example, cameras and/or other devices may have been off-line (e.g., for repair) or may have recently been added onto the communications network after the forecasting engine has made the initial search. Any additional cameras and/or other devices that subsequently provide information to the forecasting engine may have that time stamp and location information provided as described in step 440.

At step 460, the forecasting engine performs a weather condition map analysis. In embodiments, the weather condition map analysis is used to forecast weather conditions at locations based on identified changes in weather conditions over multiple points in time. The weather condition map analysis is further described in FIG. 5.

At step 465, the forecasting engine performs a single camera time series analysis. In embodiments, the single camera time series analysis is used to forecast weather conditions based on the correlation between: (i) identified changes in images (e.g., photo/video content) across multiple points in time for a single camera; and (ii) predictive weather patterns stored in a database. The single camera time series analysis is further described in FIG. 6.

At step 470, the forecasting engine integrates the weather condition map analysis and the single camera time series analysis into a consolidated forecast. At step 475, the forecasting engine stores the aggregated weather forecast by location and time. In embodiments, the forecasting engine assigns the location and time. In alternate embodiments, the time and location information can be sent by the camera and/or other device to the forecasting engine.

At step 480, the forecasting engine aggregates the consolidated weather forecasts into weather forecast maps. In embodiments, the forecasting engine can store weather forecast maps and integrate the weather forecasts into the weather forecast maps. At step 485, the forecasting engine extrapolates the data over those areas that did not provide image information to complete the weather forecast map by location. Additionally, the forecasting engine can also integrate additional weather analysis, as described in step 470 to gather up-to-date information for the weather map. Furthermore, the weather forecast may be for a particular amount of time. For example, the weather forecast may be for a particular future amount of time (e.g. for the next ten hours, 24 hours, five days, month, etc.). Thus, the forecasting engine stores the total weather forecast. The stored weather forecast may then be used to update weather forecast maps which are made available for consumers.

Figure 5:
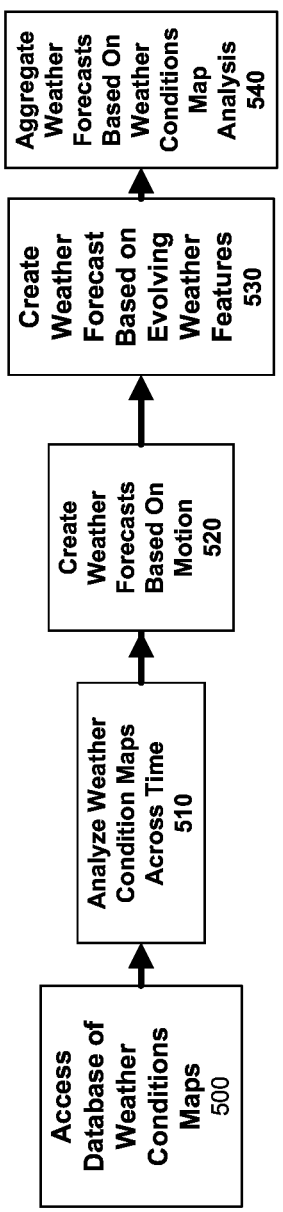

FIG. 5 shows a flow for determining weather condition map analysis in accordance with aspects of the present invention. At step 500, the forecasting engine accesses a database that contains maps of weather conditions at different points in time, also known as weather maps. In embodiments, parameters may be implemented that determine a threshold age of the weather maps. For example, the forecasting engine may determine that weather maps that are less than two years old, three years old, etc., should be used.

At step 510, the forecasting engine analyzes the weather maps. In embodiments, the forecasting engine identifies movement and changes in weather conditions across a geographic area. For example, the forecasting engine may identify cloud movements, changes in precipitation, changes in barometer readings, changes in temperatures, and/or any other type of changes associated with weather conditions.

In embodiments, the weather conditions can take different forms. For example, the weather conditions can include constant weather features and/or evolving weather features. In embodiments, constant weather features can represent weather phenomena that maintain their attributes as they move from one location to another location. For example, at a first location there are rain clouds, and are rain clouds from the same weather phenomena at a second location that is one mile north of the first location. Thus, the weather phenomena can be considered as a constant weather feature since there is no change in weather from the first location and the second location.

In embodiments, evolving weather features represent phenomena that have attributes that change as they move from one location to another location. For example, at a first location there is snow being produced by a weather phenomena and at a second location, that is one mile south of the first location, the same weather phenomena is producing sleet. Thus, the weather phenomena can be considered as an evolving weather feature since there is a change in weather from the first location and the second location.

At step 520, the forecasting engine creates a weather forecast based on the movement of weather phenomena. In embodiments, the forecasting engine uses images from the cameras and/or other devices to analyze the weather condition maps over time to determine a projected path of the observed weather phenomena. Further, the forecasting engine also determines a probability (e.g., 20%, 40%, 95%, etc.) that the weather phenomena will occur. At step 530, the forecasting engine determines weather forecasts based on evolving weather features and their motion across an area over time by using speed, direction, correlation to known weather patterns, with a probability of occurrence at a certain location. The probability can be determined by using one or more different types of mathematical and/or statistical methodologies (e.g., regression analysis, chi-squares, random variables, distribution graphs, etc.)

At step 540, the forecasting engine aggregates the constant and evolving weather features into a single forecast based on the analysis of weather condition maps for the individual camera locations. Once the forecasting engine determines the weather condition map analysis, the forecasting engine, as described in FIG. 4, combines the weather condition map analysis with the single camera time series analysis described in FIG. 6 to provide a complete weather forecast.

Figure 6:
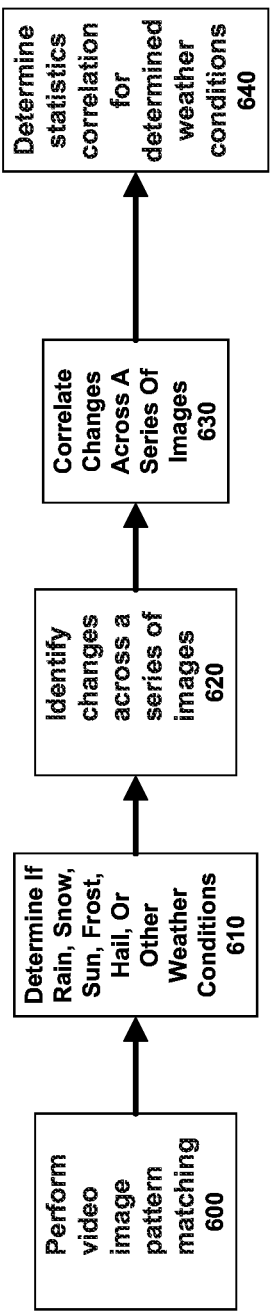

FIG. 6 shows a flow for determining a single camera time series analysis in accordance with aspects of the present invention. At step 600, the forecasting engine performs image pattern matching for images captured at different times. In embodiments, the forecasting engine compares shapes within individual images captured at specific times, from a camera, with weather characteristics stored by the forecasting engine. For example, an image may show hail and the forecasting engine may determine that the image shows hail by measuring the size of the hail. The forecasting engine may also determine that multiple vertical streaks, stream, or similar patterns, within an image indicate a downfall of some kind of precipitation.

At step 610, the forecasting engine may determine, based on the size of the precipitation, other image shapes (e.g., clouds, lightening, etc.), temperature conditions, the type of precipitation and/or other weather conditions. For example, the forecasting engine may determine that the precipitation is rain, snow, frost, or hail. At step 620, the forecasting engine identifies changes across a series of images for a camera and/or device. In embodiments, the forecasting engine identifies changes across a series of images by using cataloged weather conditions stored by the forecasting engine. As such, the analysis is performed to match stored weather patterns to the weather patterns being shown in the series of images from that particular camera and/or device.

At step 630, the forecasting engine correlates changes across a series of images to predict patterns of weather. In embodiments, the forecasting engine correlates identified weather patterns at each camera's location to databases of predictive weather patterns stored by the forecasting engine. At step 640, the forecasting engine determines a statistical correlation for determined weather forecast. For example, the forecasting engine determines a confidence level associated with each match that reflects the probabilistic nature of the forecast (e.g., rain predicted in one hour will have an 80% chance of occurring). Once the forecasting engine determines the single camera time series analysis, the forecasting engine, as described in FIG. 4, combines the weather condition map analysis, described in FIG. 5, with the single camera time series analysis to perform further analysis to determine the weather forecast.

Figure 7:
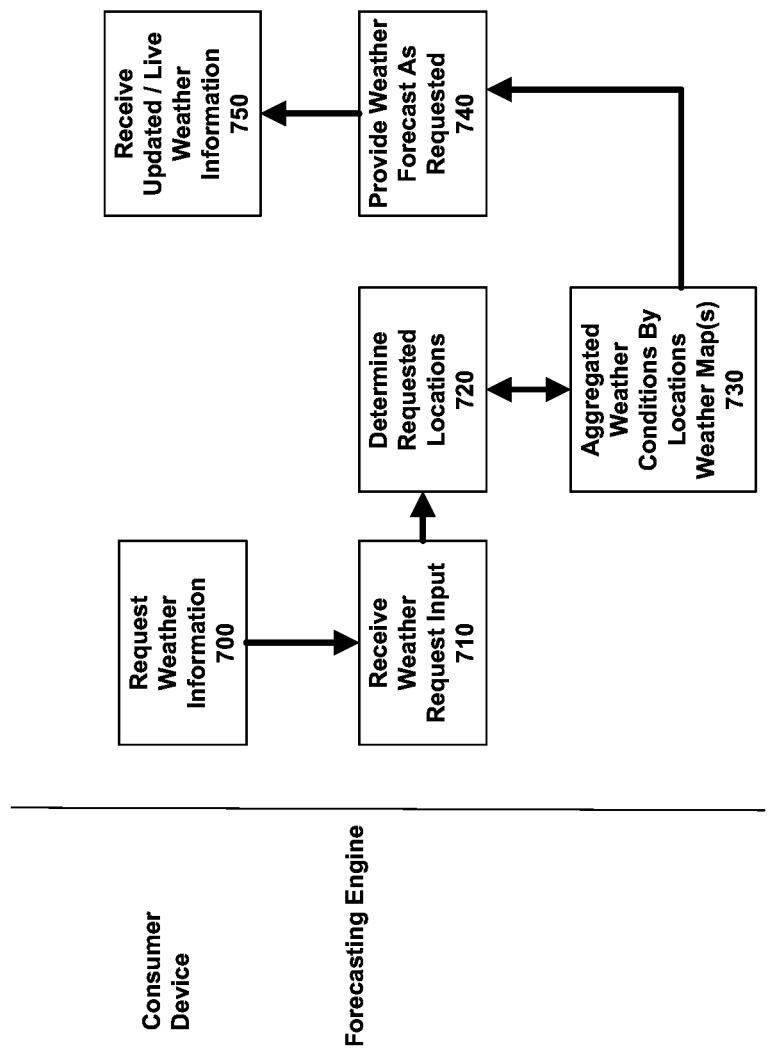

FIG. 7 shows a swim lane diagram for providing the weather forecast to users in accordance with aspects of the present invention. At step 700, a device requests weather information from the forecasting engine. In embodiments, the device can be a laptop, a desktop computer, a smartphone, or any other type of device that can display any graphical and textual information. The device may be used by a person or an organization that has requested weather forecasts from the forecasting engine. In alternate embodiments, the device can be registered to automatically receive a weather forecast from the forecasting engine and may not require the device to request any weather forecast; rather, the forecasting engine intermittingly sends weather forecasts to the device.

At step 710, the forecasting engine receives the weather forecast request from the device. At step 720, the forecasting engine determines the locations for which the weather forecast is being requested. In embodiments, the forecasting engine can determine the location based on the device providing specific location information (e.g., a city name, a zip code, a county, etc.). Additionally, or alternatively, the forecasting engine can determine the location by receiving IP address information, GPS information, or other locator information that can be tagged with a weather forecast request from the device. For example, the user of the subscriber device may select an icon that requests weather information based on the location of the subscriber device.

At step 730, the forecasting engine aggregates weather forecasts for a requested location. In embodiments, the forecasting engine generates a weather forecast with the current data stored by the forecasting engine. At step 740, the forecasting engine generates (provides) a weather forecast for the device. The weather forecast may be formatted to include tables, maps, and/or any other type of graphical or textual information that can be displayed by the subscriber device (e.g., via a web page, within a text message), etc. At step 750, the subscriber device receives the weather forecast. In embodiments, the subscriber device also has the option of requesting additional weather forecasts.

FIG. 8 shows a flow for providing a feedback system to improve weather forecasting in accordance with aspects of the present invention. At step 810, the forecasting engine stores weather forecasts for each camera location that are generated by the processes described in FIGS. 1-7. In embodiments, the stored weather forecasts can include additional information, such as the current timestamp and also the associated time for which the forecasted weather condition is to occur.

At step 820, the forecasting engine compares the observed weather conditions with forecasted weather conditions for the same time. In embodiments, the forecasting engine may be receiving additional information from a camera and/or device at that location, or the forecasting engine may request the camera and/or device to specifically provide current weather conditions.

At step 830, the forecasting engine determines the deviations between the forecasted weather and the actual weather conditions. In embodiments, the forecasting engine can determine whether the weather forecast accurately determined the type of precipitation, temperature, cloud cover, lightning, and/or any other type of forecasted weather feature. Additionally, or alternatively, forecasts can determine whether particular image quality levels are causing errors and/or whether particular sources of the images are causing errors in the weather forecasts. At step 840, the forecasting engine modifies its analytical system to improve future weather forecasts. In embodiments, the forecasting engine may determine whether any errors/deviations are due to camera/device malfunction, the location of the camera, the type of device (e.g., smart-phone, stationary camera, etc.). Once the forecasting engine has determined and corrected the errors/deviations, the forecasting engine can continue to receive information and determine weather forecasts with a higher level of accuracy.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of using multiple sensors at different locations to predict weather comprising:
   providing sensors at locations different from one another, each sensor being configured to provide images including current weather related information at the location where the sensor is located;
   receiving, by at least one computing device, the images from the sensors in an initial search that include weather related information;
   identifying, by the at least one computing device, the location of each of the sensors based upon information provided by the sensors;
   searching for additional sensors at locations different from the sensors that provided the images in the initial search;
   receiving additional images from the additional sensors and identifying the locations of the additional sensors based upon information provided by the additional sensors;
   performing a time series analysis to forecast weather conditions comprising:
   analyzing, by the at least one computing device, the images from the sensors and the additional sensors to determine particular types of weather phenomena;
   analyzing, by the at least one computing device, the images from the sensors and the additional sensors to determine a motion of the particular types of weather phenomena; and
   determining, by the at least one computing device, a first weather forecast based on the analyzed images and the motion of the particular types of weather phenomena;
   performing a weather map analysis to forecast weather conditions comprising:
   accessing a database of weather maps showing weather conditions at different points of time;
   analyzing the weather maps to determine constant weather features at two or more different sensor locations, wherein each sensor location includes at least one of the sensors and the additional sensors, at the different points of time and evolving weather features at the two or more different locations of the sensors and the additional sensors at the different points of time; and
   aggregating the constant weather features and the evolving weather features to create a second weather forecast based on the weather map analysis; and
   integrating the first weather forecast and the second weather forecast into a consolidated weather forecast,
   wherein the additional sensors are sensors which were present within an area covered by the initial search, which were off-line during the initial search.

2. The method of claim 1, further comprising determining a probability that the first weather forecast will occur.

3. The method of claim 1, wherein the sensors and the additional sensors include at least one of traffic cameras, security cameras, mobile cameras, and mobile devices.

4. The method of claim 1, wherein the analyzing the images to determine the particular types of weather phenomena includes analyzing the images for different types of precipitation, wherein the precipitation includes at least one of rain, hail, sleet, and snow.

5. The method of claim 1, wherein the analyzing the images to determine the particular types of weather phenomena includes analyzing the images for levels of grey that are used to determine sky conditions.

6. The method of claim 1, further comprising:
   receiving sensor information that includes information relating to at least one of temperature, pressure, magnetic levels, and humidity; and
   analyzing the sensor information to determine the weather related information and using the weather related information to determine the first weather forecast.

7. The method of claim 1, wherein the images provided by the sensors and the additional images provided by the additional sensors are associated with a particular image quality level.

8. The method of claim 1, wherein the images provided by the sensors and the additional images provided by the additional sensors include at least one of structured data, unstructured data, and a combination of the structured data and the unstructured data.

9. The method of claim 1, further comprising:
   determining a level of accuracy of the first weather forecast by comparing the first weather forecast with actual weather phenomena; and
   updating the at least one computing device's weather forecasting capabilities based on the level of accuracy.

10. The method of claim 1, wherein the weather maps include information indicating at least one of pressure levels and temperature levels.

11. The method of claim 1, further comprising searching for new additional sensors to receive new additional images including the weather related information from after the location of each of the sensors and the additional sensors has been identified and before analyzing the images and additional images to determine the particular types of weather phenomena.

12. The method of claim 1, further comprising determining an age of the weather maps in the database and comparing the age of the weather maps with a predetermined threshold age of the weather maps, wherein the analyzing of the weather maps is limited to weather maps which do not exceed the predetermined threshold age.

13. A method of using multiple sensors at different locations to predict weather comprising:
providing sensors at locations different from one another, each sensor being configured to provide images including current weather related information at the location where the sensor is located;
receiving, by at least one computing device, the images from the sensors in an initial search that include weather related information;
identifying, by the at least one computing device, the location of each of the sensors based upon information provided by the sensors;
searching for additional sensors at locations different from the sensors that provided the images in the initial search;
receiving additional images from the additional sensors and identifying the locations of the additional sensors based upon information provided by the additional sensors;
performing a time series analysis to forecast weather conditions comprising:
analyzing, by the at least one computing device, the images from the sensors and the additional sensors to determine particular types of weather phenomena;
analyzing, by the at least one computing device, the images from the sensors and the additional sensors to determine a motion of the particular types of weather phenomena; and
determining, by the at least one computing device, a first weather forecast based on the analyzed images and the motion of the particular types of weather phenomena;
performing a weather map analysis to forecast weather conditions comprising:
accessing a database of weather maps showing weather conditions at different points of time;
analyzing the weather maps to determine constant weather features at two or more different sensor locations, wherein each sensor location includes at least one of the sensors and the additional sensors, at the different points of time and evolving weather features at the two or more different locations of the sensors and the additional sensors at the different points of time; and
aggregating the constant weather features and the evolving weather features to create a second weather forecast based on the weather map analysis; and
integrating the first weather forecast and the second weather forecast into a consolidated weather forecast,
wherein the additional sensors are sensors which were placed at locations within an area covered by the initial search after the initial search and prior to the analysis of the weather maps.

* * * * *

UNITED STATES PATENT AND TRADEMARK OFFICE
CERTIFICATE OF CORRECTION

| | | |
|---|---|---|
| PATENT NO. | : 10,295,704 B2 | Page 1 of 1 |
| APPLICATION NO. | : 15/054246 | |
| DATED | : May 21, 2019 | |
| INVENTOR(S) | : Richard M. Haas et al. | |

It is certified that error appears in the above-identified patent and that said Letters Patent is hereby corrected as shown below:

On the Title Page

Item (72), change "William H. Rinckel", to --H. William Rinckel--.

Signed and Sealed this
Twenty-first Day of April, 2020

Andrei Iancu
*Director of the United States Patent and Trademark Office*